United States Patent [19]
Haigh

[11] Patent Number: 5,874,997
[45] Date of Patent: Feb. 23, 1999

[54] MEASURING AND REGULATING SYNCHRONIZATION OF MERGED VIDEO AND AUDIO DATA

[75] Inventor: Stephen G Haigh, Palo Alto, Calif.

[73] Assignee: FutureTel, Inc., Sunnyvale, Calif.

[21] Appl. No.: 325,430

[22] PCT Filed: Aug. 29, 1994

[86] PCT No.: PCT/US94/09565

§ 371 Date: Dec. 30, 1997

§ 102(e) Date: Dec. 30, 1997

[87] PCT Pub. No.: WO96/07274

PCT Pub. Date: Mar. 7, 1996

[51] Int. Cl.⁶ .................................................. H04N 7/12
[52] U.S. Cl. .................... 348/423; 348/515; 370/538; 375/355
[58] Field of Search ................................ 348/423, 482, 348/484, 515, 516; 371/5.1, 5.2, 30; 370/522, 538, 442, 471, 473, 498, 537; 375/240, 241, 225, 355; H04N 7/12

[56] References Cited

U.S. PATENT DOCUMENTS

| | | | |
|---|---|---|---|
| 4,734,764 | 3/1988 | Pocock et al. | 358/86 |
| 4,847,690 | 7/1989 | Perkins | 358/143 |
| 4,849,817 | 7/1989 | Short | 358/142 |
| 5,053,860 | 10/1991 | Tsinberg | 358/12 |
| 5,231,492 | 7/1993 | Dangi et al. | 348/423 |
| 5,323,396 | 6/1994 | Lokhoff | 370/471 |
| 5,481,543 | 1/1996 | Veltman | 348/423 |

*Primary Examiner*—Tommy P. Chin
*Assistant Examiner*—Gims Philippe
*Attorney, Agent, or Firm*—Donald E. Schreiber

[57] ABSTRACT

This invention concerns real-time assembly of a compressed audio-visual system data stream (22) so the audio and video data may be subsequently presented in synchronism. Assembly of a system data stream (22) in accordance with present invention interleaves packets of data selected from a compressed audio bitstream (16) with packets of data selected from a compressed video bitstream (18). If frames of video data being assembled into the system data stream (22) advance too far ahead of the audio data being assembled into the system data stream (22), then all the data for a single frame of the video signal is omitted from the system data stream (22). Conversely, if frames of video data being assembled into the system data stream (22) lag too far behind the audio data being assembled into the system data stream (22), then a second copy of all the data for a single frame of the video signal is assembled into the system data stream (22).

12 Claims, 2 Drawing Sheets

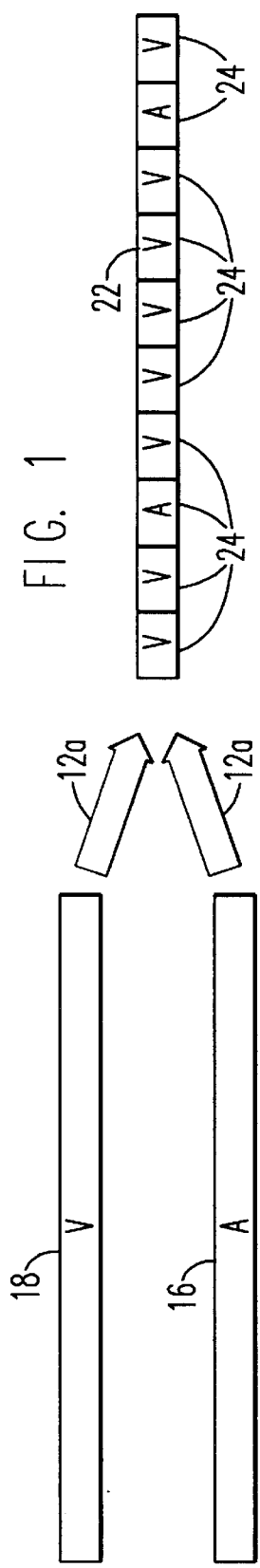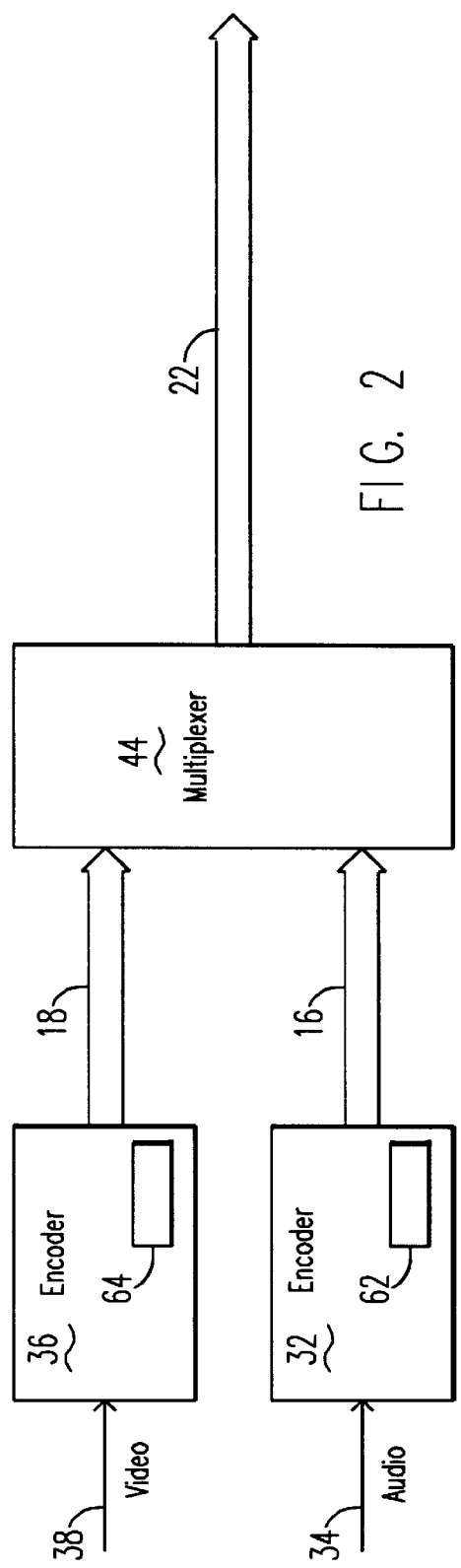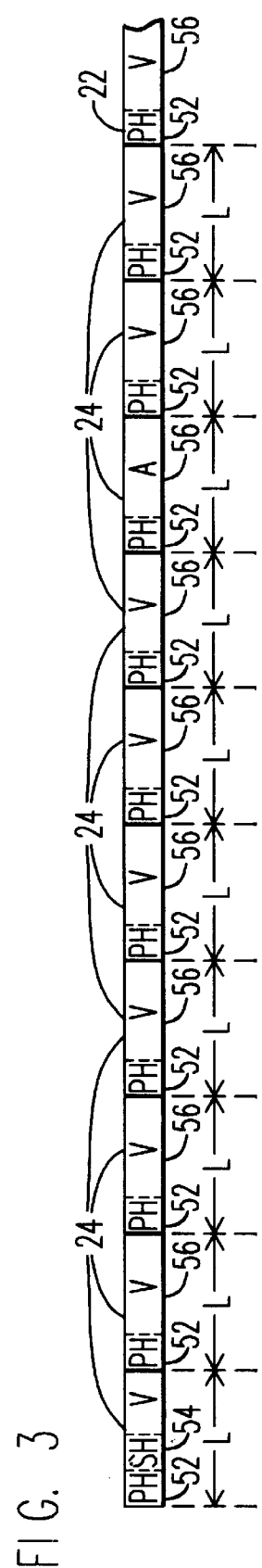

```
1   mpsstat.input_aframe_count =
2       ace_ReadMAELoopCount();
3   mpsstat.input_vframe_count =
4       vsif_GetEncodedFrameNumber();
5   mpsstat.encoded_vframe_count =
6       mpsstat.input_vframe_count+
7       mpsstat.vframes_added_by_resync+
8       INITIAL_INPUT_VFRAME_OFFSET;
9   mpsstat.input_sample_time = getTimeInMilliSeconds();
10  /* find ratio of audio frames to video frames  */
11  /* INPUT to coders and get difference from     */
12  /* expection ratio                             */
13  mpsstat.vpts_error =
14    ((double)mpsstat.input_aframe_count/
15      (double)mpsstat.encoded_vframe_count)-
16        mpsstat.a2v_frame_ratio;
17
18  mpsstat.temporal_drift = (mpsstat.vpts_error*
19      mpsstat.encoded_vframe_count)* mpsstat.aframe_time;
20  /* low pass filter drift since it fluctuates quite a bit   */
21  lpfilt(&mpsstat.temporal_drift_filt, mpsstat.temporal_drift,
22                                        0.02);
23
24  /* correct for a/v input rate drift by         */
25  /* adding/removing b pics from video bs        */
26  if(add_drop_pictures) {
27      if(mpsstat.temporal_drift_filt < -50.0) {
28         shrink_gop=1;
29         mpsstat.temporal_drift_filt=0.0;       /* stop multiple
30                                                   occurances   */
31      } else if(mpsstat.temporal_drift_filt > 50.0) {
32         expand_gop=1;
33         mpsstat.temporal_drift_filt=0.0;       /* stop multiple
34                                                   occurances   */
35      }
36  }
```

FIG. 4

MEASURING AND REGULATING SYNCHRONIZATION OF MERGED VIDEO AND AUDIO DATA

TECHNICAL FIELD

The present invention relates generally to the technical field of recorded and/or transmitted compressed digital data, and, more particularly, to enabling a subsequent synchronized presentation of video and audio data as they are combined into a single compressed digital data stream.

BACKGROUND ART

Proper reproduction of a recorded and/or transmitted multimedia program, consisting of compressed digitized video data accompanied by associated compressed digitized audio data, requires combining two independent digital data bitstreams into a single, synchronized, serial system data stream that includes both video and audio data. Lack of or an improper synchronization of the video and audio data in assembling the data into the system data stream, or in decoding and presenting an assembled system data stream, frequently causes a visible image to appear out of synchronization with accompanying sound. For example, a presentation of images showing lip movements of an individual speaking words may not be synchronized with the audible sound of those words.

To address the preceding issue, Part 1 of the Moving Pictures Experts Group ("MPEG") standard, International Organization for Standardisation ("ISO") and International Electrotechnical Commission ("IEC") standard ISO/IEC 11172, defines a framework which permits combining-bitstreams of digitized video and audio data into a single, synchronized, serial system data stream. Once combined into a single digital data stream, the data is in a form well suited for digital storage, such as on a hard disk or CD-ROM included in a digital computer, or for transmission, such as over a cable antenna television ("CATV") system or high bit rate digital telephone system, e.g. a T1, ISDN Primary Rate, or ATM digital telecommunications access. A system data stream assembled in accordance with the ISO/IEC 11172 standard may be decoded by an MPEG decoder to obtain decoded pictures and/or decoded audio samples The ISO/IEC 11172 standard defining MPEG compression specified that packets of data, extracted from the compressed video bitstream and from the compressed audio bitstream, are to be interleaved in assembling the system data stream. Furthermore, in accordance with the ISO/IEC 11172 standard a system data stream may include private, reserved and padding streams in addition to compressed video and compressed audio bitstreams. While properties of the system data stream as defined by the MPEG standard impose functional and performance requirements on MPEG encoders and decoders, the system data stream specified in the MPEG standard does not define an architecture for or an implementation of MPEG encoders or decoders. In fact, considerable degrees of freedom exists for possible designs and implementations of encoders and decoders that operate in accordance with the ISO/IEC 11172 standard.

A system data stream in accordance with Part 1 of the ISO/IEC 11172 standard includes two layers of data; a system data layer which envelopes digital data of a compression layer. The ISO/IEC 11172 system layer is itself divided into two sub-layers, one layer for multiplex-wide operation identified as the "pack layer," and one for stream-specific operations identified as the "packet layer." Packs, belonging to the pack layer of a system data stream in accordance with the ISO/IEC 11172 standard, include headers which specify a system clock reference ("SCR"). The SCR fixes intended times for commencing decompression of digitized video and audio data included in the compression layer in a period of 90 kilohertz ("kHz").

To effect synchronized presentation of digitized video and audio data, the ISO/IEC 11172 standard defining the packet layer provides for "presentation time-stamps" ("PTS") and also optional decoding time-stamps ("DTS"). The PTS and DTS specify synchronization for the video and audio data with respect to the SCR specified in the pack layer. The packet layer, which optionally contains both the PTS and DTS, is independent of the data contained in the compression layer defined by the ISO/IEC 11172 standard. For example, a video packet may start at any byte in the video stream. However, the PTS and optional DTS if encoded into each packet's header apply to the first "access unit" ("AU") that begins within that packet.

The MPEG standard ISO/IEC 11172 defines an AU to be the coded representation of a "presentation unit" ("PU"). The ISO/IEC 11172 standard further defines a PU as a decoded audio AU or a decoded picture. The standard also defines three (3) different methods, called "Layers" in the standard, for compressing and decompressing an audio signal. For two of these methods, the standard defines an audio AU as the smallest part of the encoded audio bitstream which can be decoded by itself. For the third method, the standard defines an audio AU as the smallest part of the encoded audio bitstream that is decodable with the use of previously acquired side and main information.

Part 1 of the ISO/IEC 11172 standard suggests that during synchronized presentation of compressed video and audio data, the reproduction of the video images and audio sounds may be synchronized by adjusting the playback of both compressed digital data streams to a master time base called the system time-clock ("STC") rather than by adjusting the playback of one stream, e.g. the video data stream, to match the playback of another stream, e.g. the audio data stream. The ISO/IEC 11172 standard suggests that an MPEG decoder's STC may be one of the decoder's clocks (e.g. the SCR, the video PTS, or the audio PTS), the digital storage media ("DSM") or channel clock, or it may be some external clock. End-to-end synchronization of a multimedia program encoded into an MPEG system data stream occurs:

a. if an encoder embeds time-stamps during assembly of the system data stream;

b. if video and audio decoders receive the embedded time-stamps together with the compressed data, and c. if the decoders use the time-stamps in scheduling presentation of the multimedia program.

To inform an MPEG decoder that an encoded bitstream has an exact relationship to the SCR, a "system header" ("SH"), which occurs at the beginning of a system data stream and which may be repeated within the stream, includes a "system_audio_lock_flag" and a "system_video_lock_flag." Setting the system_audio_ lock_flag to one (1) indicates that a specified, constant relationship exists between the audio sampling rate and the SCR. Setting the system_video_lock_flag to one (1) indicates that a specified, constant relationship exists between the video picture rate and the SCR. Setting either of these flags to zero (0) indicates that the corresponding relationship does not exist.

As set forth above, the ISO/IEC 11172 standard specifically provides that the system data stream may include a padding stream. Packets assembled into the system data stream from the padding stream may be used to maintain a constant total data rate, to achieve sector alignment, or to prevent decoder buffer underflow. Since the padding stream is not associated with decoding and presentation, padding stream packets lack both PTS and DTS values.

In addition to the padding stream, "stuffing" of up to 16 bytes is allowed within each packet. Stuffing is used for purposes similar to that of the padding stream, and is particularly useful for providing word (16-bit) or long word (32-bit) alignment in applications where byte (8-bit) alignment is insufficient. Stuffing is the only method of filling a packet when the number of bytes required is less than the minimum size of a padding stream packet.

A bitstream of video data compressed in accordance with Part 2 of the ISO/IEC 11172 standard consists of a succession of frames of compressed video data. A succession of frames in an MPEG compressed video data bitstream include intra ("I") frames, predicted ("P") frames, and bidirectional ("B") frames. Decoding the data of an MPEG I frame without reference to any other data reproduces an entire uncompressed frame of video-data. An MPEG P frame may be decoded to obtain an entire uncompressed frame of video data only by reference to a prior decoded frame of video data, either reference to a prior decoded I frame or reference to a prior decoded P frame. An MPEG B frame may be decoded to obtain an entire uncompressed frame of video data only by reference both to a prior and to a successive reference frame, i.e. reference to decoded I or P frames. The ISO/IEC 11172 specification defines as a group of pictures ("GOP") one or more I frames together with all of the P frames and B frames for which the I frame(s) is(are) a reference.

In assembling a system data stream, a real-time MPEG encoder must include a system header at the beginning of each system data stream, and that system header must set the system_audio_lock_flag and the system_video_lock_flag to either zero (0) or one (1). If a real-time MPEG encoder specifies that either or both of these flags are to be set, then it must appropriately insure that throughout the entire system data stream the specified, constant relationship exists respectively between the audio sampling rate and the SCR, and between the video picture rate and the SCR. If a compressed audio bitstream encoder operates independently of the rate at which frames of video occur, there can be no assurance that these constant relationships will exist in the encoded data that is to be interleaved into the system data stream.

DISCLOSURE OF INVENTION

An object of the present invention is to provide a method for assembling a system data stream which permits synchronized presentation of visible images and accompanying sound.

Another object of the present invention is to provide a system data stream which maintains a constant relationship between the audio sampling rate and the SCR.

Another object of the present invention is to provide a system data stream which maintains a constant relationship between the video picture rate and the SCR.

Briefly, the present invention is a method for real-time assembly of an encoded system data stream that may be decoded by a decoder into decoded video pictures and into a decoded audio signal. In particular, a system data stream assembled in accordance with the present invention permits a, decoder to present the decoded audio signal substantially in synchronism with the decoded video pictures. This system data stream is assembled by interleaving packets of data selected from a compressed audio bitstream with packets of data selected from a compressed video bitstream. The compressed audio bitstream interleaved into the system data stream is generated by compressing an audio signal that is sampled at a pre-specified audio sampling rate. The compressed video bitstream interleaved into the system data stream is generated by compressing a sequence of frames of a video signal having a pre-specified video frame rate.

Before commencing assembly of the system data stream, an expected encoded audio-video ratio is computed which equals the pre-specified audio sampling rate divided by the pre-specified video frame rate. A system header ("SH") is then embedded into the system data stream which includes both a system_audio_lock_flag and a system_video_lock_flag that are set to indicate respectively that a specified, constant relationship exists between an audio sampling rate and a system clock reference ("SCR"), and a specified, constant relationship exists between a video picture rate and the SCR. Packets of data are then respectively selected from either the compressed audio bitstream or from the compressed video bitstream for assembly into the system data stream. To effect synchronization, a presentation time-stamp ("PTS") and also an optional decoder time-stamp ("DTS") are embedded into the system data stream together with each packet.

Furthermore, an actual encoded audio-video ratio is computed which equals a total number of frames of the video signal that have been received for compression divided by a number that represents a count of all the samples of the audio signal that have been received for compression. Using the actual encoded audio-video ratio, an encoded frame error value is then computed by first subtracting the expected encoded audio-video ratio from the actual encoded audio-video ratio to obtain a difference of the ratios. This difference of the ratios is then multiplied by the total number of frames of the video signal that have been received for compression.

If the encoded frame error value thus computed is less than a pre-specified negative error value, all data in the compressed video bitstream for an entire frame of the video signal is then omitted from the system data stream. Conversely, if the encoded frame error value is greater than a pre-specified positive error value, then all the data for a second copy of an entire frame of the video signal is assembled from the compressed video bitstream into the system data stream. In the preferred embodiment of the present invention, both the pre-specified positive error value and the pre-specified negative error value represent an interval of time which is approximately equal to the time interval required for presenting one and one-half frames of the decoded video pictures.

An advantage of the present invention is that it produces a system data stream which may be decoded more easily.

Another advantage of the present invention is that it produces a system data stream which may be decoded by a variety different decoders.

Another advantage of the present invention is that it produces a system data stream which may be decoded by comparatively simple decoders.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1 is a diagram graphically depicting interleaving packets selected from a compressed audio bitstream with packets selected from a compressed video bitstream to assemble a system data stream;

FIG. 2 is a block diagram illustrating a video encoder for compressing a sequence of frames of a video signal into a compressed video bitstream, an audio encoder for compressing an audio signal into a compressed audio bitstream, and a multiplexer for interleaving packets selected from the compressed video bitstream with packets selected from the compressed audio bitstream to assemble a system data stream;

FIG. 3 is a diagram illustrating a system data stream assembled by interleaving packets selected from a compressed audio bitstream with packets selected from a compressed video bitstream; and FIG. 4 is a computer program written in the C programming language which implements the process for determining if all data for an entire frame of the video signal is to be omitted from the system data stream, or if all the data for a second copy of an entire frame of the video signal is to be assembled into the system data stream.

BEST MODE FOR CARRYING OUT THE INVENTION

Arrows 12a and 12b in FIG. 1 depict interleaving packets selected from a compressed audio bitstream 16 with packets selected from a compressed video bitstream 18 to assemble a serial system data stream 22 consisting of concatenated packs 24. An audio encoder 32, illustrated in the block diagram FIG. 2, generates the compressed audio bitstream 16 by processing an audio signal, illustrated in FIG. 2 by an arrow 34. The audio encoder 32 generates the compressed audio bitstream 16 by first digitizing the audio signal 34 at a pre-specified audio sampling rate ("PSASR"), and then compressing the digitized representation of the digitized audio signal. A video encoder 36 generates the compressed video bitstream 18 by compressing into MPEG GOPs a sequence of frames of a video signal, illustrated in FIG. 2 by an arrow 38, which has a pre-specified video frame rate ("PSVFR"). The audio encoder 32 is preferably an audio compression engine model no. 96-0003-0002 marketed by FutureTel, Inc. of 1092 E. Arques Avenue, Sunnyvale, Calif. 94086. The video encoder 36 is preferable a video compression engine model no. 96-0002-002 also marketed by FutureTel, Inc. The preferred audio encoder 32 and video encoder 36 are capable of real-time compression respectively of the audio signal 34 into the compressed audio bitstream 16, and the video signal 38 into the compressed video bitstream 18.

In real-time, a system data stream multiplexer 44 repetitively selects a packet of compressed audio data or compressed video data respectively from the compressed audio bitstream 16 or from the compressed video bitstream 18 for interleaved assembly into packs 24 of the system data stream 22 illustrated in FIG. 1. The system data stream multiplexer 44 is preferably a computer program executed by a host microprocessor included in a personal computer (not illustrated in any of the Figures) in which the audio encoder 32 and the video encoder 36 are located. In preparing the audio encoder 32 and the video encoder 36 respectively for compressing the audio signal 34 and the video signal 38, the computer program executed by the host microprocessor transfers commands and data to the audio encoder 32 and to the video encoder 36 to produce at pre-specified bitrates the compressed audio bitstream 16 and the compressed video bitstream 18. To accommodate overhead required for control data embedded in the system data stream, the sum of the bitrates specified by the computer program for the compressed audio bitstream 16 and the compressed video bitstream 18 are slightly less than the a bitrate specified for the system data stream 22. In addition to directing the audio encoder 32 to produce the compressed audio bitstream 16 at a pre-specified bitrate, the host microprocessor transfers additional control data to the audio encoder 32 which directs the audio encoder 32 to digitize the audio signal 34 at the PSASR.

In addition to transferring control data to the audio encoder 32 and to the video encoder 36 to prepare them for respectively producing the compressed audio bitstream 16 and the compressed video bitstream 18, the computer program executed by the host microprocessor also prepares certain data used in assembling the system data stream 22. In particular with respect to the present invention, the computer program executed by the host microprocessor computes an expected encoded audio-video ratio ("EEAVR") for the system data stream 22 by dividing the PSASR by the PSVFR.

After the computer program executed by the host microprocessor has completed preparations for assembling the system data stream 22, the system data stream multiplexer 44 repetitively selects a packet of data respectively from the compressed audio bitstream 16 or from the compressed video bitstream 18 for assembly into the packs 24 of the system data stream 22. As illustrated in FIG. 3, every pack 24 of the assembled system data stream 22 in accordance with the ISO/IEC 11172 specification has a pre-specified length L. Each pack 24 may have a length L as long as 65,536 bytes. Each pack 24 begins with a pack header 52, designated PH in FIG. 3, which includes the system clock reference ("SCR") value for that particular pack 24.

In the first pack 24 of the system data stream 22, a system header 54, designated as SH in FIG. 3, follows immediately after the pack header 52. In accordance with the ISO/IEC 11172 specification, the system header 54 may also be repeated in each pack 24 in the system data stream 22. The system header 54 includes both a system_audio_lock_flag and a system_video_lock_flag. The computer program executed by the host microprocessor sets the system_audio_lock_flag and the system_video_lock_flag to one (1) to indicate respectively that a specified, constant relationship exists between an audio sampling rate and the SCR, and a specified, constant relationship exists between a video picture rate and the SCR.

Following the pack header 52 and the system header 54 if one is included in the pack 24, the remainder of each pack 24 illustrated in FIG. 3 contains a packet 56 of data selected by the system data stream multiplexer 44 either from the compressed audio bitstream 16 or from the compressed video bitstream 18. Each packet 56 includes a packet header, not illustrated in any of the Figures, which may contain a presentation time stamp ("PTS") and may also include the optional decoding time stamp ("DTS") in accordance with ISO/IEC 11172 specification.

Though not depicted in any of the FIGS., the system data stream 22 in accordance with the present invention may also include packs of a padding stream. As permitted under the ISO/IEC 11172 specification, the system data stream multiplexer 44 will assemble packs from the padding stream into the system data stream 22 to maintain a constant total data rate, to achieve sector alignment, or to prevent decoder buffer underflow.

Because the preferred audio encoder 32 generates the compressed audio bitstream 16 by digitizing the audio signal 34 at a pre-specified sampling rate, and then compresses the digitized audio signal to produce the compressed audio bitstream 16 at a pre-specified bitrate, the compressed audio bitstream 16 produced by the preferred audio encoder 32 inherently provides a stable timing reference for assigning the SCR, the PTS and the DTS to the packs 24 of the system data stream 22. By comparison, due to random fluctuations in the frame rate of the video signal 38 which occur if the video signal 38 is being produced by replaying a video cassette on a video cassette recorder ("VCR") or by playing a laser disk on a laser disk player, the frame rate of the video signal 38 does not provide a stable timing reference for assigning the SCR, the PTS and the DTS.

During assembly of the system data stream 22, the computer program executed by the host microprocessor fetches data from the audio encoder 32 and the video encoder 36 in addition to packets 56 selected from the compressed audio bitstream 16 or from the compressed video bitstream 18. In particular, the system data stream multiplexer 44 fetches from a location 62 in the audio encoder 32 a number that represents a running count of all the samples ("NOS") of the audio signal 34 that the audio encoder 32 has received for compression. Analogously, the system data stream multiplexer 44 also fetches from a location 64 in the video encoder 36 a running count of the total number of frames ("NOF") of the video signal 38 that the video encoder 36 has received for compression. The computer program executed by the host microprocessor fetches these two values as close together in time as possible. The system data stream multiplexer 44 then divides NOS by NOF to obtain an actual encoded audio-video ratio ("AEAVR")

The system data stream multiplexer 44 then first subtracts the previously computed EEAVR from the AEAVR to obtain a difference of ratios ("DOR"). Then the DOR is multiplied by NOF to obtain an encoded frame error value ("EFEV"). EFEV represents a difference in time, based upon the pre-specified audio sampling rate, between the actual time for the NOF that have been assembled into the system data stream 22, and the expected time for the NOF that have been assembled into the system data stream 22.

If the EFEV thus computed is less than a pre-specified negative error value ("PSNEV"), because the actual time for NOF assembled into the compressed video bitstream 18 exceeds the expected time for NOF assembled into the compressed video bitstream 18 by more than PSNEV, then the system data stream multiplexer 44 omits from the system data stream 22 all data for an entire B frame in the compressed video bitstream 18. If the EFEV is greater than a pre-specified positive error value ("PSPEV"), because the actual time for NOF assembled into the compressed video bitstream 18 is less than the expected time for NOF assembled into the compressed video bitstream 18 by more than PSPEV, then the system data stream multiplexer 44 assembles into the system data stream 22 a second copy of all the data for an entire B frame in the compressed video bitstream 18.

The preferred values for the PSNEV and for the PSPEV represent an interval in time required for the presentation of one and one-half frames of the decoded video pictures. Thus, only if the magnitude of the EFEV represents an interval of time which exceeds the time interval required for the presentation of one and one-half frames of the decoded video pictures will an entire B frame in the compressed video bitstream 18 be omitted from the system data stream 22, or will a second copy of an entire B frame in the compressed video bitstream 18 be assembled into the system data stream 22.

Because each frame in the system data stream 22 in accordance with Part 2 of the ISO/IEC 11172 is numbered, if the system data stream multiplexer 44 omits from the system data stream 22 all data for an entire B frame in the compressed video bitstream 18, then the system data stream multiplexer 44 must renumber all subsequent frames in the present GOP accordingly before assembling them into the system data stream 22. Correspondingly, if the system data stream multiplexer 44 assembles into the system data stream 22 a second copy of all the data for an entire B frame in the compressed video bitstream 18, then the system data stream multiplexer 44 must number that frame and renumber all subsequent frames from the present GOP accordingly.

FIG. 5 is a computer program written in the C programming language which implements the process for determining if all data for an entire frame of the video signal 38 is to be omitted from the system data stream 22, or if all the data for a second copy of an entire frame of the video signal 38 is to be assembled into the system data stream 22. Line numbers 1–8 in FIG. 4 fetch counts from the location 62 in the audio encoder 32, and from the location 64 in the video signal 38 to establish values for NOF and NOS. Line numbers 13–16 in FIG. 4 implement the computation of EFEV. Line numbers 21–22 in FIG. 4 apply the low pass filter to EFEV. Line numbers 26–36 in FIG. 4 determine whether all data for an entire frame of the video signal 38 is to be omitted from the system data stream 22, or if all the data for a second copy of an entire frame of the video signal 38 is to be assembled into the system data stream 22.

Industrial Applicability

In establishing the bitrate for the compressed video bitstream 18, the computer program executed by the host microprocessor sets that bitrate approximately one percent (1%) below a desired nominal bitrate for the system data stream 22 minus the pre-specified bitrate for the compressed audio bitstream 16. Setting the bitrate for the compressed video bitstream 18 one percent (1%) below the desired nominal bitrate provides a sufficient safety margin that the sum of the bitrates for the compressed audio bitstream 16 and the compressed video bitstream 18 plus the overhead of the system data stream 22 should never exceed the maximum bitrate for the system data stream 22 even though occasionally a second copy of all the data for an entire B frame in the compressed video bitstream 18 is assembled into the system data stream 22.

The system data stream multiplexer 44 only begins omitting B frames from or adding B frames to the system data stream 22 after the system data stream multiplexer 44 has been assembling the system data stream 22 for several minutes. The system data stream multiplexer 44 inhibits omission or addition of B frames for a short interval of time to avoid erratic operation. Such erratic omission or addition of B frames during the first few minutes of the system data stream 22 is a consequence of dividing one comparatively small number for NOS by another comparatively small number for NOF. Small numbers occur for NOS and NOF during the first few minutes of operation because commands sent from the computer program executed by the host microprocessor that respectively trigger operation of both the audio encoder 32 and the video encoder 36 causes microcode executed both in the audio encoder 32 and in the video encoder 36 to reset to zero (0) respectively the counts present in the location 62 and in the location 64. After an interval of several minutes, the counts NOS and NOF become sufficiently large that successive DORs do not change that markedly from one GOP to the next.

In addition to completely inhibiting omission or addition of B frames for a short interval of time during the first few minutes of the system data stream 22, prior to testing EFEV to determine if a B frame should be omitted from or added to the system data stream 22, a low pass filter is applied to EFEV to further inhibit erratic omission or addition of B frames. Applying a low pass filter to EFEV insures that B frames are omitted from or added to the system data stream 22 only in response to a long term trend in the difference between the EEAVR and the AEAVR, and not due to fluctuations in the values of NOS and NOF, perhaps due to reading one value of either NOS or NOF during one GOP and reading the corresponding value either of NOF or NOS during the immediately preceding or immediately succeeding GOP.

The preferred low pass filter applied to EFEV has an asymmetric response. That is, characteristics of the low pass filter cause the filter's output value to return to zero (0) more quickly in response to a zero (0) value for EFEV than the filter's output value departs from zero in response to a non-zero value for EFEV. The actual response times employed in the low pass filter are determined empirically. Furthermore, if the system data stream multiplexer 44 omits from or adds to the system data stream 22 a frame of the compressed video bitstream 18, then the low pass filter's output value is arbitrarily set to zero (0). Setting the low pass filter's output value to zero (0) tends to inhibit the omission of an entire frame of the compressed video bitstream 18 or the addition of a second copy of an entire frame of the compressed video bitstream 18 during processing of immediately succeeding MPEG GOPs.

The combination of the preferred audio encoder 32, the preferred video encoder 36, and the system data stream multiplexer 44 in accordance with the present invention permits assembly of virtually any desired system data stream 22 directly and without any intervening processing operations. For example, Phillips Consumer Electronics B.V., Coordination Office Optical and Magnetic Media Systems, Building SA-1, P.O. Box 80002, 5600 J B Eindhoven, The Netherlands has established a specification for Video CD that is colloquially referred to as the "White Book" standard. Phillips' White Book standard specifies a maximum bitrate for the compressed video bitstream 18 of 1,151929.1 bits per second, an audio sampling frequency of 44.1 kHz, and an audio bitrate of 224 kBits per second. Phillips' White Book standard also specifies that an audio packet is to be 2279 bytes long while a video packet has a length of 2296 bytes, and the system data stream 22 has a pack rate of 75 packs per second. The system data stream multiplexer 44 in accordance with the present invention, operating in conjunction with the preferred audio encoder 32 and the preferred video encoder 36, can directly assemble a system data stream 22 in accordance with Phillips' White Book standard from a suitably specified compressed audio bitstream 16 and compressed video bitstream 18 without any intervening operations.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for real-time assembly of an encoded system data stream which is decodable by a decoder into decoded video pictures and into a decoded audio signal, the system data stream being assembled so the decoder presents the decoded audio signal substantially in synchronism with the decoded video pictures, the system data stream being assembled by interleaving packets of data selected from a compressed audio bitstream with packets of data selected from a compressed video bitstream, the compressed audio bitstream being generated by compressing an audio signal that is sampled at a pre-specified audio sampling rate ("PSASR"), the compressed video bitstream being generated by compressing a sequence of frames of a video signal having a pre-specified video frame rate ("PSVFR"), the method comprising the steps of:

a. before commencing assembly of the system data stream, computing an expected encoded audio-video ratio ("EEAVR") which equals of the PSASR divided by the PSVFR;

b. embedding in the system data stream a system header ("SH") in which both a system_audio_lock_flag and a system_video_lock_flag are set to indicate respectively that a specified, constant relationship exists between an audio sampling rate and a system clock reference ("SCR"), and a specified, constant relationship exists between a video picture rate and the SCR;

c. repetitively selecting a packet of data respectively from the compressed audio bitstream or from the compressed video bitstream for assembly into the system data stream;

d. repetitively embedding into the system data stream, together with each packet selected respectively from the compressed audio bitstream or from the compressed video bitstream, a presentation time-stamp ("PTS");

e. computing an actual encoded audio-video ratio ("AEAVR") which equals a number that represents a count of all the samples ("NOS") of the audio signal that have been received for compression divided by a total number of frames ("NOF") of the video signal that have been received for compression;

f. computing an encoded frame error value ("EFEV") by first subtracting the EEAVR from the AEAVR to obtain a difference of ratios ("DOR"), and then multiplying the DOR thus computed by NOF; and g. if the EFEV is less than a pre-specified negative error value ("PSNEV"), omitting from the system data stream all data for an entire frame of the video signal.

2. The method of claim 1 comprising the further step of:

h. if the EFEV is greater than a pre-specified positive error value ("PSPEV"), assembling into the system data stream a second copy of all the data for an entire frame of the video signal.

3. The method of claim 2 wherein the PSPEV represents an interval of time which is greater than a time interval required for presentation of one-half of a single frame of the decoded video pictures.

4. The method of claim 2 wherein during several minutes immediately following commencing assembly of the system data stream omission of a frame of the video signal from the system data stream, and addition of a second copy of all the data for an entire frame of the video signal to the system data stream, are inhibited.

5. The method of claim 2 comprising the further step of:

i. applying a low pass filter to EFEV before determining whether to omit a frame of the video signal from the system data stream, and before determining whether to add a frame of the video signal to the system data stream.

6. The method of claim 1 wherein the PSNEV represents an interval of time which is greater than a time interval required for presentation of one-half of a single frame of the decoded video pictures.

7. The method of claim 1 wherein during several minutes immediately following commencing assembly of the system data stream omission of a frame of the video signal from the system data stream is inhibited.

8. The method of claim 1 comprising the further step of:
   h. applying a low pass filter to EFEV before determining whether to omit a frame of the video signal from the system data stream.

9. A method for real-time assembly of an encoded system data stream which is decodable by a decoder into decoded video pictures and into a decoded audio signal, the system data stream being assembled so the decoder presents the decoded audio signal substantially in synchronism with the decoded video pictures, the system data stream being assembled by interleaving packets of data selected from a compressed audio bitstream with packets of data selected from a compressed video bitstream, the compressed audio bitstream being generated by compressing an audio signal that is sampled at a pre-specified audio sampling rate"), the compressed video bitstream being generated by compressing a sequence of frames of a video signal having a pre-specified video frame rate ("PSVFR"), the method comprising the steps of:
   a. before commencing assembly of the system data stream, computing an expected encoded audio-video ratio ("EEAVR") which equals of the PSASR divided by the PSVFR;
   b. embedding in the system data stream a system header ("SH") in which both a system_audio_lock_flag and a system_video_lock_flag are set to indicate respectively that a specified, constant relationship exists between an audio sampling rate and a system clock reference ("SCR"), and a specified, constant relationship exists between a video picture rate and the SCR;
   c. repetitively selecting a packet of data respectively from the compressed audio bitstream or from the compressed video bitstream for assembly into the system data stream;
   d. repetitively embedding into the system data stream, together with each packet selected respectively from the compressed audio bitstream or from the compressed video bitstream, a presentation time-stamp ("PTS");
   e. computing an actual encoded audio-video ratio ("AEAVR") which a number that represents a count of all the samples ("NOS") of the audio signal that have been received for compression divided by equals a total number of frames ("NOF") of the video signal that have been received for compression;
   f. computing an encoded frame error value ("EFEV") by first subtracting the EEAVR from the AEAVR to obtain a difference of ratios ("DOR"), and then multiplying the DOR thus computed by the total number of frames of the video signal that have been received for compression; and
   g. if the EFEV is greater than a pre-specified positive error value ("PSPEV"), assembling into the system data stream a second copy of all the data for an entire frame of the video signal.

10. The method of claim 9 wherein the PSPEV represents an interval of time which is greater than a time interval required for presentation of one-half of a single frame of the decoded video pictures.

11. The method of claim 9 wherein during several minutes immediately following commencing assembly of the system data stream addition of a second copy of all the data for an entire frame of the video signal to the system data stream is inhibited.

12. The method of claim 9 comprising the further step of:
   h. applying a low pass filter to EFEV before determining whether to add a frame of the video signal to the system data stream.

* * * * *